United States Patent Office 2,739,388
Patented Mar. 27, 1956

2,739,388

TRANSFER CALIPERS

Niels C. Mickelson, Denver, Colo.

Application December 7, 1954, Serial No. 473,592

7 Claims. (Cl. 33—153)

This invention relates to a mechanic's tool of the type generally known as a transfer caliper, and has for its principal object the provision of a simple, easily used, and highly accurate caliper which can be used for determining internal diameters of work pieces and for transferring the determined diameters to the exterior of the work piece for measurement.

Another object of the invention is to provide a transfer caliper more particularly for use by machine inspectors which will require but one hand to insert it in the work piece, expand it to the desired diameter for gauging an internal diameter, contract and withdraw it from the work piece, thence expand it to the gauged diameter for checking and measurement and to provide a caliper of this type which will instantly and accurately reproduce the desired diameter, either within the work piece or after being removed therefrom.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a front view of the improved transfer caliper illustrating it as it would appear while gauging the internal diameter of a shouldered work piece;

Fig. 2 is a similar view, illustrating the caliper as it would appear when contracted for withdrawal from the work piece;

Fig. 3 is a side view of the improved caliper; and

Fig. 4 is an enlarged, detail, longitudinal section, taken on the line 4—4, Fig. 1.

In Figs. 1 and 2 a typical work piece has been indicated in broken line at 10, with an internally projecting flange at 11.

The improved transfer caliper is adapted for gauging the internal diameter of the typical work piece, such as shown in broken line at 10, and is designed so that it may be contracted to allow it to be withdrawn through a portion of smaller diameter, such as indicated by the internal flange 11 on the work piece 10, thence re-expanded to accurately reproduce the previously determined internal diameter of the work piece for measurement, and is more particularly designed for accomplishing the gauging, the contracting and the re-expanding with the use of but one hand.

The improved caliper comprises a pair of internal caliper legs, which will be herein designated as the fixed leg 12 and the movable leg 13, the extremities of which are turned outwardly, as indicated at 14, any desired distance to provide convenient internal calipering. Both of the legs are pivotally mounted upon a bushing sleeve 15 provided with a head flange 22 at its rear extremity.

A metallic clamping strap 16 surrounds the bushing sleeve 15 and depends therefrom to form a short strap extremity 17 and a long strap extremity 18. The strap 16 and the legs 12 and 13 are clamped in place upon the bushing sleeve 15 by means of a clamp bolt 19 and a clamping nut 20. The bolt 19 acts to clamp suitable clamp washers 21 against the clamping strap 16 to force the latter against the legs 12 and 13 and clamp the legs against the head flange 22 of the bushing sleeve 15. A resilient lock washer 23 may be positioned between the extremity of the bushing sleeve 15 and the clamp washers 21 to force the latter away from the strap 16 when the nut 20 is loosened and resist accidental rotation of the clamp bolt 19.

A first toggle arm 24 is formed integrally with and projects from the head flange 22 of the bushing sleeve 15. A second toggle arm 25 is either formed on or permanently secured to the first caliper leg 12 and extends sidewardly beneath the bushing sleeve 15 adjacent the second caliper leg 13, thence upwardly in V-shaped relation to the first toggle arm 24.

A relatively short toggle link 26 is pivotally mounted on a pivot boss 27, or other suitable pivoting device, upon the upper extremity of the first toggle arm 24. A relatively long toggle link 28 is pivoted to the upper extremity of the second toggle arm 25 upon a suitable pivot rivet 29, or other suitable pivoting device. The extremity of the short toggle link 26 is hingedly connected to the long toggle link 28, intermediate the extremities of the latter, upon a hinge rivet 30 or other suitable hinging device.

The distance between the axes of the pivot boss 27 and the hinge rivet 30 is equal to the distance between the axes of the hinge rivet 30 and the pivot rivet 29. The extremity of the long toggle link 28, which extends beyond the hinge rivet 30, is offset forwardly so that it may swing downwardly adjacent the forward face of the first toggle arm 24, and is provided with a receiving notch 31 in which the pivot boss 27 is received when the toggle links 26 and 28 are brought into alignment, as shown in Fig. 1. The pivot boss 27 acts as a stop device and when in contact with the bottom of the notch 31, it acts to prevent the toggle links from moving beyond the fully aligned position.

The clamping strap 16 can be clamped about the bushing sleeve 15, to prevent relative movement therebetween, by means of a clamp screw 32 which extends through the long strap extremity 18 and is threaded through a threaded bushing or nut 33 fixedly mounted on the short strap extremity 17. The screw 32 is provided with an elongated head 34 terminating in any suitable rotating means, such as a knurled portion 35.

It can be seen that if the head 34 be rotated in a clockwise direction, it will act against the long strap extremity 18 to force the latter toward the short strap extremity 17 to cause the strap 16 to be fixedly clamped about the bushing sleeve 15.

An angle clip 36 is formed on or welded to the movable caliper leg 13. A micrometer adjustment screw 37 extends through the extremity of the long strap extremity 18 and through the angle clip 36. A micrometer adjustment nut 38 is threaded on the screw 37 and rests against the angle clip 36. A compression spring 39 surrounds the screw 37 between the angle clip 36 and the strap extremity 18. The screw 37 is prevented from rotating in the strap extremity 18 in any desired manner, for instance it may be fixedly formed therein or provided with a non-circular shank passing through a non-circular hole in the extremity 18.

*Operation*

Let us assume it is desired to measure the internal diameter of the work piece 10. The extremities 14 of the caliper are placed within the work piece, with the screw 32 loosened. The toggle links 26 and 28 are then brought into alignment with each other, so as to expand the legs 12 and 13 until the extremities 14 bear against the inside of the work piece. Further movement of the toggle links toward the aligned position acts to rotate the bushing sleeve 15 within the strap 16 until the links reach the fully aligned position of Fig. 1. The nut 33 is now tightened to fixedly lock the strap and bushing sleeve together and the micrometer nut 38 is adjusted to swing the movable caliper leg 13 slightly inwardly or outwardly until the proper "feel" is obtained to bring the extremities 14 against the work piece without straining the caliper.

The caliper is now gripped with the hand about the pivotal portion thereof and with the thumb resting against the protruding extremity of the long toggle link 28. The latter extremity is now forced upwardly with the thumb to break the toggle links so as to cause the extremities 14 to contract sufficiently to allow them to pass outwardly through the flange 11. The long link 28 is now swung downwardly with the thumb to cause the extremities 14 to accurately resume their preset position so that the internal diameter of the work piece can be accurately measured.

For inspection gauging purposes, the caliper is preset with the toggle links closed. It can then be taken in one hand and quickly controlled and inserted in the work piece thence expanded to check the desired internal diameter while the other hand is used to support the piece.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A transfer caliper comprising: a first caliper leg; a second caliper leg; means pivoting said two legs together; a toggle arm affixed to and extending beyond the pivot point of said first leg; a second toggle arm extending beyond the pivot point of said second leg; a bushing projecting from said second toggle arm and through both said legs and acting as the pivot therefor; a clamping device mounted on said second leg and adapted to clamp said bushing to secure said second leg to said second toggle arm when desired; and toggle links joining said toggle arms so that when said links are thrown out of alignment, said legs will be contracted toward each other.

2. A transfer caliper as described in claim 1 in which the clamping device comprises: an elongated strap having its mid-portion wrapped about said bushing, and having its extremities projecting therefrom; means for contracting said extremities to cause said strap to clamp said bushing; and means for securing said strap to said second leg.

3. A transfer caliper as described in claim 2 in which the means for securing the strap to the second leg comprises: an angle clip projecting from said second leg; a micrometer screw extending from one projecting extremity of said strap through said clip; and means for securing said screw in said clip.

4. A transfer caliper as described in claim 3 in which the means for securing said screw in said clip comprises: a compression spring positioned between said strap extremity and said clip and acting to urge them apart; and a micrometer nut threaded on said micrometer screw and acting against said clip to impart compression to said spring.

5. A transfer caliper comprising: a first caliper leg; a second caliper leg; a first toggle arm affixed to said first leg; a second toggle arm; a bushing sleeve projecting from said second toggle arm, both said caliper legs being hingedly mounted on said bushing sleeve in juxtaposition to each other, said first toggle arm projecting from said first caliper leg in V-shaped relation to said second toggle arm; means for releasably securing said second leg to said bushing; and a pair of toggle links extending between the flaring extremities of said toggle arms for causing the latter to approach and separate from each other.

6. A transfer caliper as described in claim 5 in which one of said toggle links is longer than the other so as to provide a projecting operating extremity for use in aligning and mis-aligning said links.

7. A transfer caliper as described in claim 6 having a notch formed in the projecting extremity of said longer toggle link and a stop boss projecting from the hinge point of the shorter toggle link and adapted to enter said notch when said arms are brought into alignment.

References Cited in the file of this patent

UNITED STATES PATENTS

| | | |
|---|---|---|
| 485,944 | Jones | Nov. 8, 1892 |
| 768,333 | Le Blanc | Aug. 23, 1904 |